INVENTORS
August Winsel
Hans-Jürgen Schwartz

United States Patent Office 3,649,467
Patented Mar. 14, 1972

3,649,467
VAPORIZATION APPARATUS FOR THE REMOVAL OF HEAT AND CONCENTRATION OF ELECTROLYTE IN A FUEL CELL BATTERY
August Winsel and Hans-Jürgen Schwartz, Kelkheim, Taunus, Germany, assignors to Varta Aktiengesellschaft, Frankfurt am Main, Germany
Filed Feb. 13, 1968, Ser. No. 705,173
Claims priority, application Germany, Feb. 13, 1967, V 32,954; Feb. 18, 1967, V 33,004; Mar. 11, 1967, V 33,231; Apr. 1, 1967, V 33,352, V 33,353
Int. Cl. B01d 3/00; H01n 27/00
U.S. Cl. 202—160
19 Claims

ABSTRACT OF THE DISCLOSURE

Process and equipment for recovering, in liquid form, vaporizable components from compositions by bringing the composition into contact with one side of a porous wall through which the component to be recovered is caused to permeate as a vapor, and the vapor is subsequently condensed on a second wall and recovered therefrom in liquid form. The second wall may also be porous and the vapors of the vaporizable components may be allowed to pass through the second wall before being recovered in condensed form.

BACKGROUND OF THE INVENTION (1) Field of the invention

The invention relates to the removal of vaporizable components from compositions such as solutions and slurries in order to obtain such components in pure form and/or increase the non-vaporizable component content of such compositions.

(2) Description of the prior art

Numerous processes and devices have been proposed wherewith vaporizable components of various types of compositions could be separated from such compositions and from each other. Such processes and devices include those used in the fields of distillation, rectification and vaporization.

One type of composition which requires the removal of vaporizable components therefrom is the aqueous electrolytes which are used in the operation of fuel cell batteries which employ porous gas diffusion electrodes therein. Water is generated during the operation of many of such batteries and unless it were removed it would pass into the electrolyte and impede the operation of the battery. The water must be removed therefore in order to maintain the efficiency of the battery. Many methods have been proposed for the removal of excess water from such electrolytes under such circumstances. For this purpose, in most of these processes, one of the gases used in the operation of the battery is circulated between a hot gas diffusion electrode in the battery and a cold condensation surface outside the battery, whereupon water which is vaporized from the meniscus of the pores of the hot porous electrodes is carried from the battery with the hot gas and is condensed on the condensation surface and thus removed from the battery. The dewatered gas is usually recycled to the battery. One such procedure is disclosed in U.S. application Ser. No. 635,032 filed May 1, 1967. In such procedures the speed of the hot stream of gas being circulated from the battery determines the efficiency with which the water can be removed from the battery. When the fuel cell battery is operating at low temperatures a very large amount of carrier gas must be employed and recycled in order to remove the desired amounts of water from the battery and this requires the expenditure of a considerable amount of energy.

The extraction of liquid components from solutions containing them is also commonly carried out in distillation columns, the manner of operation of which is described in textbooks relating to processing technology. In the extraction equipment used in such processes the vaporization of the more readily vaporizable components from such solutions takes place on distillation trays or plates concurrently with the feeding to the trays of an amount of the solution which corrsponds to the amount of vaporizable component that is vaporized. By arranging such distillation trays in accordance with the so-called "cascade principle" it is possible to obtain a flow of higher boiling components in liquid form from above and down through a countercurrent flowing flow of vapors of the lower boiling components of the solution being processed.

Distillation or rectification installations of this type, however, require a great deal of space for their operation and are very complicated to build.

SUMMARY OF THE INVENTION

An object of the present invention is to provide a simple process whereby vaporizable components of various types of compositions may be readily removed from such compositions.

Another object of the present invention is to provide simple devices and apparatus wherewith the process of the present invention may be conducted.

The essence of the present invention resides in contacting one side of a porous wall with a composition having vaporizable components therein, causing one or more such vaporizable components to vaporize and pass through the porous wall under such conditions that it is only the desired vaporizable component that passes through the porous wall in any substantial amount, and then condensing the vapors that pass through the porous wall and recovering the condensed vapors in liquid form.

DESCRIPTION OF THE PREFERRED EMBODIMENTS

Figure 1:
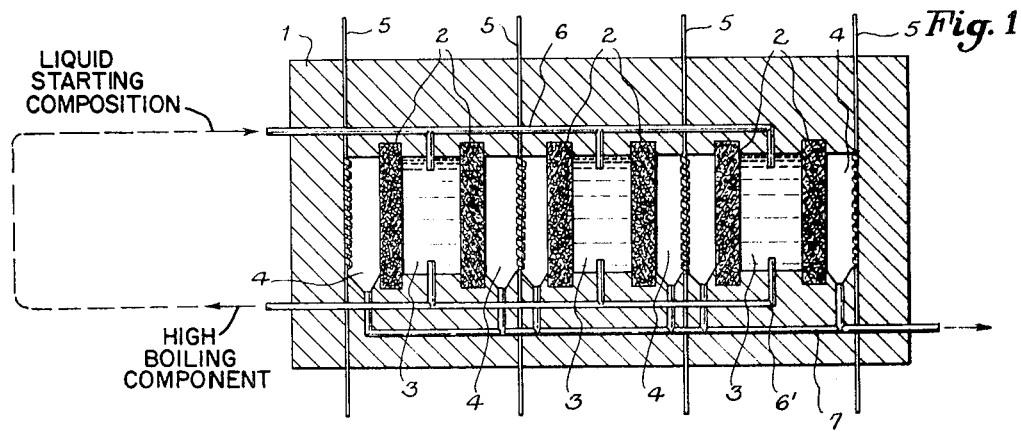
FIG. 1 shows a device in which veporizable components of a liquid composition may be readily recovered from such composition according to the present invention utilizing a series of recovery units.

The problems facing those in the art relative to the removal of vaporizable components from compositions containing such components have been solved to a great extent by the present invention. The present inventors, as a result of their investigation of the properties of various types of porous bodies, have developed valuable, reliable and simple procedures and devices whereby vaporizable components of various types of compositions can be separated and recovered in any desired degree of purity from such compositions, and from each other where two or more of such components are present in such compositions.

The basic process of the present invention consists in bringing into contact with one side of a porous wall, a composition containing one or more vaporizable components allowing the vaporizable component to permeate through the porous wall in vapor form, condensing the vapors into liquid form on the surface of a second wall, and then recovering the resulting liquid. The porous wall must be such as is capable of being wetted by the composition under the prevailing conditions and the pores of the porous wall must be permeable to the vapors of the vaporizable components to be removed from the compositions, but impervious to any components of such compositions which are in liquid or solid form under the prevailing operating conditions. In order that the vaporizable component of the compositions which is to be removed therefrom is in vapor form, it may be necessary to heat the composition and/or the porous vaporization wall to such temperature as will cause the desired vaporization. The surface of the wall on which the vapors to be recovered are to be condensed is preferably cooled to a temperature below that of the composition or the wall from which the vaporizable component is being recovered in vapor form. The wall on which the vapors are condensed may be termed the condensing wall. The side of the porous wall to which the starting composition is brought into contact and through which the vapors enter such wall may be termed the vapor inlet side of such porous wall and the side of the porous wall from which the vapors pass out of the porous wall may be termed the vapor outlet side of such porous wall.

The purification of the recovered products is achieved due to the fact that the vaporization step of the process is conducted under such conditions of temperature and pressure that substantially only the desired vaporizable component or components of the composition being processed will vaporize and pass through the pores of the porous wall. Under such circumstances the less vaporizable components of the starting composition remain behind in the form of liquids or solids that cannot permeate the porous wall.

The compositions being processed, according to the present invention, are usually heated in order to facilitate the vaporization of the vaporizable component, or components, to be recovered therefrom, each time vapors from the composition are to be passed through the porous wall, and the surface of the condensing wall is maintained at a temperature below that of the heated composition or porous wall.

A narrow space is usually provided between the vapor exit side of the porous wall and the side of the second wall on which the vapors are condensed. The space may be termed a vapor diffusion area.

The purification process of the present invention may be used to process starting compositions in order to recover highly purified vaporizable components from such compositions, in which case the residue remaining on the vapor inlet side of the porous wall after the removal of the desired vaporizable components may be considered the impurities in the starting compositions. In another case, however, vaporizable components of a starting composition may be the undesired impurities and the process and devices of the present invention may be used to vaporize such impurities and remove them from the starting composition.

The vaporizable materials being recovered in liquid form according to the present invention, need not of course, be liquids under normal atmospheric conditions. They may be materials which are gases or solids under normal atmospheric conditions. Materials which are solids under normal atmospheric conditions may be recovered from compositions containing them according to the process of the present invention, by vaporizing such solid materials under elevated temperature and/or reduced pressure conditions, passing the resulting vapors through the porous wall, and subsequently condensing the vapors at lower temperatures and appropriate pressure conditions. Materials which are gases under normal atmospheric conditions may be recovered from compositions containing them according to the present invention by passing such gases, under possibly elevated temperature and/or reduced pressure conditions through the porous wall, and subsequently condensing such gases at lower temperatures and under appropriate increased pressure conditions. Materials which are liquids under normal atmospheric conditions may be recovered from compositions containing them according to the present invention by vaporizing such liquid materials under elevated temperature and/or reduced pressure conditions, passing the resulting vapors through the porous wall and subsequently condensing the vapors at lower temperatures and possibly also under appropriate increased pressure conditions.

The compositions which may be processed according to the present invention will contain one or more of the vaporizable components. The composition may only contain components which are all readily vaporizable and the processes and the devices of this invention may be used to separate such compositions into such components by selectively vaporizing desired components from the compositions under appropriate conditions of temperature and pressure, and recovering each of such components individually in liquid form. The composition may also be such as to contain one or more readily vaporizable components and one or more components which are either not readily vaporizable, or are not vaporizable at all for practical purposes. The processes and devices of this invention may be used to treat such latter type compositions under such conditions of temperature and pressure that only the more readily vaporizable components are vaporized from the starting compositions and recovered in liquid form.

It may often be the case that the desired extent of removal or purity cannot be attained for the vaporizable material being removed from the starting composition by only processing the starting composition one time in accordance with the present invention. One pass of the vaporizable material through the porous wall may not remove enough of the vaporizable material from the starting material. The vapors may also carry over particles of other components of the starting composition. A preferred form of the process of the present invention, therefore, is the repeated reprocessing of either the starting material, and/or the vaporizable materials recovered in liquid form, in order to obtain the desired products in the desired degree of purity. Where the vaporizable materials are the impurities, the starting material can be reprocessed several times until the desired amount of vaporizable material is removed. Where the vaporizable material is to be recovered in very pure form, the recovered vaporizable material, in liquid form, can be repeatedly reprocessed in accordance with the process of the present invention until the desired degree of purity is obtained. The purity of the desired products can be evaluated after any one or more sets of the process steps of the present invention in order to evaluate the need for further processing. Boiling points and other properties of the desired products can be used as a criteria of the degree of purity of the desired products.

Where the amount of material being processed is large, and/or relatively fast results are desired, and the cost of the additional equipment can be justified, it may be necessary to divide such material into several portions and to process each of such portions separately. Where the vaporizable components of the starting composition are the products which are to be recovered in pure form, several portions of the recovered vaporizable components can be combined in liquid form, for further processing purposes. It may also be desirable to combine, for further processing, in accordance with the present invention, several portions of the starting compositions after the removal of some of the vaporizable components thereof, in order to remove additional amounts of such vaporizable components from the starting compositions.

The starting compositions which may be processed according to the present invention include compositions which, under normal atmospheric conditions, may have the form of a solution, slurry, admixture, emulsion, dispersion, or other physical form.

Typical examples of situations in which the process and devices of the present invention may be employed include the treatment of aqueous solutions of one or more alcohols such as methanol and ethanol whereby one or more of the components of such solutions may be separated from the others; the treatment of saponification reaction mixtures during the saponification of esters in aqueous or organic solvent systems in order to remove the resulting alcohols and thereby cause a shift in the equilibrium of the reaction so as to allow the reaction to proceed to completion; the treatment of various types of reaction mixtures in which water is split off or produced as a by-product in order to remove the water from such mixtures and allow the reaction to proceed to completion; and the treatment of various types of aqueous solutions, such as solutions of reactants such as caustic, acid and electrolyte, in order to remove water therefrom in order to maintain a desired concentration of such reactants in such solutions.

The present invention is particularly useful in situations where it is necessary to separate two components of a composition from each other where both of such components are liquids under ordinary atmospheric conditions, or in situations where a material, which is a liquid under ordinary atmospheric conditions, is being continuously formed during a continuous chemical or electrochemical process and it is desirable to remove a given amount of such liquid from the reaction system in order to have the reaction proceed as far and/or as fast as possible.

The process of the present invention may be further explained with reference to the devices and equipment shown in the various drawings. In such devices the basic unit of equipment for conducting the process of the present invention may be termed a reconcentrator and it comprises one of each of the elements which were discussed above, i.e., a porous vaporization wall, a porous or non-porous condensation wall, and a gas diffusion space between the walls, as well as means to supply the compositions to be treated, and means for recovering the condensed vaporizable materials which are vaporized from the starting compositions, and then condensed on the condensation wall.

FIG. 1 shows a device in which a plurality of such units are simultaneously employed to treat a liquid starting composition under atmospheric conditions. The device shown in FIG. 1 has a housing 1 in which pairs of porous walls 2 are so arranged that a chamber 3 is positioned between each of such pairs of walls. Each chamber 3 functions as a starting composition supply chamber whereby the liquid starting composition is brought in contact with, and wets, the vapor inlet side of each of walls 2. The starting composition is supplied to the chambers 3, after being preheated if necessary to induce the desired vaporization of the vaporizable component to be removed therefrom, by means of inlet pipe 6. Walls 2 are impermeable to the liquid components of the starting composition but the vapors of the vaporizable material pass through such walls. On the vapor outlet side of each of the porous walls 2 there is positioned diffusion chamber 4 in which the vapors passing through porous walls 2 are condensed into liquids, primarily by coming into contact with the cool surface of walls 5. The surface of walls 5 is maintained at a temperature that is lower than the temperature of the composition being treated and walls 2. The means for so maintaining the temperature of walls 5 is not shown. Walls 5 may be made of metal, or a fluid permeable material, or have a spiral configuration, in order to enhance the collection and recovery, in liquid form, of the vapors condensed thereon. The condensed vapors are recovered in liquid form by allowing them to run off from chambers 4 through outlet line 7. The treated composition is circulated from chambers 3 by means of line 6'.

In order to avoid having the non-vaporizable components of the starting composition pass through porous walls 2 several precautions may be taken. One way of accomplishing this end is to form the porous wall from, or treat it with, a lyophobic material. In order to thereby shorten the time needed for vapors to pass through porous walls 2, it is advisable that only the vapor outlet side of walls 2 be made lyophobic.

A further way of accelerating the vapor diffusion process consists of maintaining an excess gas pressure in chambers 4 in order to thereby prevent the seepage of liquids from chambers 3 into or through walls 2. One acceptable way of achieving this purpose involves the use, for walls 2, of porous walls which have two layers of different pore size, one layer being fine pored and is placed adjacent chamber 3, and the other layer is coarse pored and it is placed adjacent chambers 4. Due to the difference in pressure exerted on such porous walls by the liquids and the gases, the liquids only fill the fine pored layer and the gases keep the liquids out of the coarse pored layer. The coarse pored layer can be made very thin with appropriate gas pressures in chambers 4.

By the use of lyophobic porous walls 2 the liquids barely penetrate walls 2 from chambers 3 and only wet the vapor inlet side of such porous walls. Then, if for example, as a starting composition, an aqueous solution of alkali is preheated to a temperature which is higher than the temperature in chambers 3 or the temperature in chambers 4, water is vaporized from the solution and only the vapors enter the lyophobic porous wall through the vapor inlet side. A vapor pressure equilibrium forms directly between the vapors in the porous wall and the vapors in chambers 4. Since cooling surface 5 has a lower temperature than the temperature of the starting solution and walls 2, the water vapors condense as liquid water on the surface of walls 5 and such liquid is collected by means of the run off outlet lines 7 which are positioned beneath chambers 4.

The circulation of the vaporized fluid from the large vapor outlet surface side of porous walls 2 to the cool surfaces of walls 5 can take place due to natural convection through diffusion chambers 4, or the process can be accelerated by means of a forced current of air or gas supplied from outside source. Both the natural and the forced convection processes assist the circulation of the vaporized fluid as a result of the partial pressure gradients that come into being due to the differences in temperatures between the temperature of cooled surfaces 5 and the temperature of the starting solution and walls 2.

If porous walls 2 are made of, or treated with, a lyophobic material, as described above, then the hydrostatic pressure differential between chambers 3 and 4 must be maintained at such a level that liquids in chambers 3 cannot penetrate through the pores of walls 2 and enter chambers 4. This can be accomplished by maintaining the necessary excess pressure in chambers 4 or by maintaining a negative pressure in chambers 3.

In order to provide hydrostatic pressure equilibrium with the aid of the lyophobic materials it is often sufficient to merely render the vapor outlet side surface of walls 2 lyophobic in order to prevent the formation of a film of liquid throughout walls 2. The formation of drops of liquid within the wall is thereby energetically handicapped and the meniscus of the liquid is stabilized in the openings of the pores.

Figure 2:
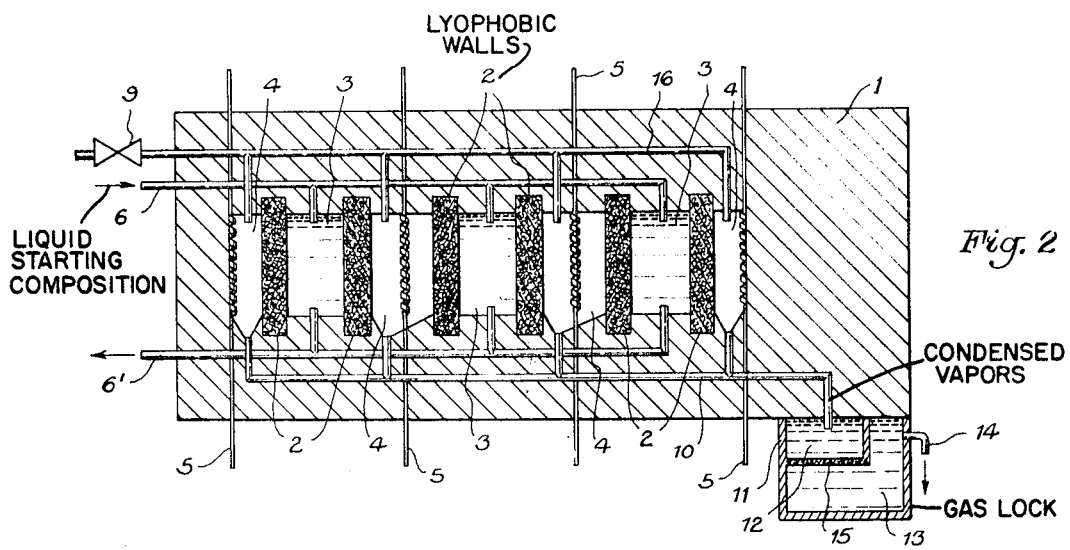
FIG. 2 shows a modification of the device of FIG. 1 wherein gas pressure is used to regulate the recovery process.

FIG. 2 shows a modification of the apparatus shown in FIG. 1 by means of which gas pressure may be used to maintain excess pressure in chambers 4 and thereby prevent the seepage of liquid into chambers 4 through walls 2 from chambers 3. The gas used to maintain the excess pressure in chambers 4 is introduced therein by means of gas lines 16. The pressurized flow of gas through line 16 and into chambers 4 is regulated by reducing valves 9. In such arrangement the recovery, from chambers 4, of the vapors that are condensed on walls 5 will also be regulated by the pressure of the gas from line 16. Under such conditions, the condensate can then be collected by means of collection canal or line 10 which empties into a drain device 11 in which fine pored separatory member 16 is located, and it partitions gas pressurized chamber 12 from liquid recovery chamber 13. When the condensate reaches chamber 12 it is forced through porous member 13 into liquid recovery chamber 13 by means of the excess gas pressure being exerted in chamber 12, and the excess of the liquid collecting in chamber 12 is allowed to run off or be recovered through outlet 14. The gas cannot permeate the fine pores of member 15 because of the capillary force of the liquid in such pores.

Figure 3:
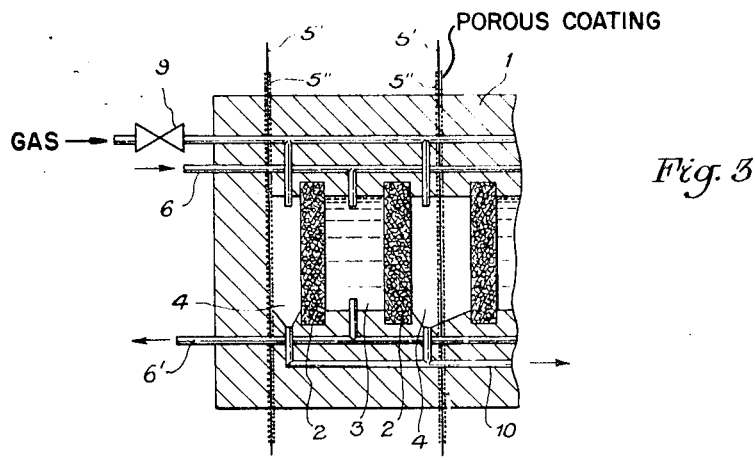
FIG. 3 shows a modification of the device of FIG. 2 wherein a porous coating is used on the condensation walls of each recovery unit.

In order to expedite or accelerate the removal of the condensate from walls 5, it is preferable that such walls be porous in nature. This arrangement avoids the formation of larger amounts of condensed liquid on the surface of such walls, and the efficiency of the walls as condensing surfaces is greatly enhanced. The condensate is collected in the pores of such walls and from there it is allowed to pass by means of gravity to the bottom of such walls from which it is collected by means of collection lines 10. In order to facilitate this arrangement the porous cooling walls 5 must have good heat conduction properties. One possible arrangement, in this regard, is shown in the equipment of FIG. 3. The device shown in FIG. 3 is a partial view of a modification of the device shown in FIG. 2. In FIG. 3 metal condensing walls 5' have porous coatings 5'' on both sides of such walls. The coating can be made of material such as blotter paper or asbestos and it acts as a wick inside chambers 4 for the absorption of liquid. Metal walls 5' extend outside container 1 in order to provide a larger heat transfer surface area. Walls 5' can be prepared by coating with, or encasing in asbestos, netting or screening made from a metal having good heat transfer properties. The portion of metal walls 5' which extends outside container 1 is preferably not coated at all in order to provide for better heat transfer. The use of such coated metal materials for walls 5' readily provides gas tight chambers and thereby provides for a more reliable use of gas pressure in chambers 4 for preventing the seepage of liquid into walls 2 from chambers 3. The pressurized gas will also prevent the condensate in porous coatings 5'' from seeping back into chamber 4. For the device of FIG. 3 it is advantageous to use lyophobic porous walls as walls 2 as a further means of helping to prevent liquid from passing through walls 2 from chambers 3 and mixing with condensate from walls 5'. In such cases it is very expedient to use, for walls 2, lyophobic porous walls having the poorest heat conductivity properties possible in order to maintain a constant difference in temperature between the temperature of walls 2 and the temperature of the condensation walls without the need for additional equipment for this purpose. The need for such a constant temperature difference arises from the facts (a) that it is the difference in temperature between that of walls 2 and the solution therein, and that of the condensation walls and the condensate therein, that leads to the flow of the vapors of the more readily vaporizable components from the hot solution being processed to the cold condensate, and (b) that the length of the vapor diffusion area is formed for the most part by the pores of the lyophobic porous walls in their entirety, since, when lyophobic walls are used as the vaporizing walls it is possible to have a very small space between the vaporizing wall and the condensation wall.

A regulation of the speed with which a vaporizable compound is to be removed from a starting composition with the process of the present invention may be necessary in some instances. It may be desirable, for example, to remove water at a specific rate from a solution of alkali which is being employed in a reaction in order to maintain a specific concentration of alkali in such solution where excess water is being concurrently generated at a specific rate during such reaction and such excess water is passing into such solution. Reactions in which this problem arises include condensation reactions and electrochemical reactions involved in the operation of galvanic fuel cell batteries. The regulation of the rate of removal of excess water from such solutions in such cases can be accomplished by controlling the rate at which heat is removed from the condensing walls and thereby control the rate at which water vapor from the processed solutions will condense on, and be recovered from, such walls. In this way the water content, for example, of electrolyte that is being used in a fuel cell battery system can be controlled while processing the electrolyte in accordance with the process of the present invention to remove excess water from such electrolyte. If too much water is removed from the electrolyte being processed, the excess of the removed water can be readily returned to the electrolyte.

The gas which is used to pressurize the condensation chambers of the devices of FIGS. 2 and 3 can be hydrogen which is supplied over line 16 from the hydrogen gas chamber of a hydrogen gas evolving electrode. The desired gas pressure for the condensation chambers can thus be supplied and maintained by the hydrogen gas generated in such electrodes. The control of the flow of gas from the electrodes to the condensation chambers can be accomplished in a simple way by interrupting or stopping the flow of electrical current to the electrodes of the electric cell to which the hydrogen gas splitting electrodes belong and thus correspondingly interrupt or stop the generation and flow of hydrogen gas. This is a more advantageous procedure than relying on the use of a supply of gas from a pressurized bottle of gas that is equipped with a pressure reducing valve. An advantageous way of using gas supplied from a hydrogen gas evolving electrode is to employ, as such electrode, a so-called gas valve electrode. Electrodes of this type are disclosed in U.S. 3,201,282. These electrodes have a coarse pored inner working layer which can contain a catalyst for the generation of the hydrogen gas from a hydrogen gas precursor such as a solution of sodium borohydride or hydroxylamine. These valve electrodes also have an outer fine pored cover layer which has a higher overvoltage relative to the hydrogen evolving reaction than the material in the working layer of the electrode.

The hydrogen gas may also be produced by the electrolytic decomposition of an aqueous liquid such as water. In such a procedure the hydrogen gas evolving electrode is placed in an electrolysis cell with an oxygen electrode and a suitable electrical current is passed through the cell. For the electrolysis of water the gas diffusion electrode can be the common non-porous type of electrodes which have sealed hydrogen gas chambers therein, or it can be a valve electrode. In the latter instance, the hydrogen gas is then generated under the desired pressure in the working layer of the valve electrode which layer serves as a hydrogen gas chamber. In a preferable modification of the process the hydrogen gas evolving electrode is combined with a porous hydrogen gas diffusion electrode so as to form a cell. The hydrogen gas diffusion electrode can be one of the known types of such porous electrodes which are used for the electrochemical preparation of hydrogen gas. The hydrogen gas diffusion electrode is connected to a supply of hydrogen gas and is connected electrically to the positive pole of the source of electrical current being supplied to the cell. The hydrogen gas evolving electrode, which is a valve electrode in this case, is connected electrically to the negative pole of the source of current for the cell. The hydrogen gas supplied to the hydrogen gas diffusion electrode is placed in solution electrochemically and is then reformed as gaseous hydrogen under pressure in the working layer of the valve electrode from where it is supplied to devices such as those shown in FIGS. 2 and 3.

This last manner of operation has the advantage in that one can supply hydrogen gas from a highly pressurized gas bottle to a diffusion electrode having a suitable construction and operating under suitable operating conditions, and can then take the purest hydrogen gas from the valve electrode under the desired pressure resulting from the generation of the gas in the working layer of such valve electrodes. It is also possible to supply the most impure hydrogen gas to the diffusion electrode and to generate pure hydrogen gas in the valve electrode for the maintenance of the gas pressure in the condensation chambers of the reconcentrators of FIGS. 2 and 3.

The use of hydrogen gas from fuel cell elements is particularly useful during the separation of reaction water from the electrolyte fluids of fuel cell batteries in the devices of FIGS. 2 and 3. In hydrogen-oxygen fuel cell batteries the hydrogen gas diffusion electrode can be connected to the gas supply lines of the hydrogen electrode of the fuel cell battery, so that the gas evolving cell advantageously forms a unit with the composite battery block formed from the individual fuel cell elements. With fuel cell batteries which use fuel other than hydrogen, such as methanol, another form of the device of the present invention may be employed, by means of which hydrogen gas can be generated by electrolysis of an aqueous solution. The source of electric current for the electrolysis cell in such cases then, is, expediently, the fuel cell battery and the electrolysis cell is itself placed in the reconcentrator devices, such as those of FIGS. 2 and 3.

The electrolysis cell can also be placed in the fuel cell battery. In this way, for example, an electrolysis cell can be inserted as an electrolysis cell of a compact, synthetic resin cast battery block and be provided with gas lines for hydrogen and oxygen.

Fuel cell elements and fuel cell batteries operate with a relatively high loss of power and, because of their good heat insulation properties, lose relatively little heat to their surroundings, so that the operating temperatures of such devices are always relatively high. As a result, the electrolyte which is circulated to and from such devices for use therein also becomes relatively hot. Thus, when such hot electrolyte is processed in accordance with the process of the present invention there normally arises a sufficient difference between the temperature of the vaporizing wall and the temperature of the condensing wall as to cause an adequate flow of vapor between the two walls without the need for further provisions in this regard. The same situation will prevail in other types of chemical reaction systems where the solution or composition to be processed in accordance with the present invention is heated during the course of the reactions in such systems. However, in other instances heat may have to be applied to the vaporizing wall in order to provide for the desired flow of vapor through such wall. In such instances it is desirable to only bring a portion of the composition to be processed into contact with the vaporizing wall in order to avoid the need of having to heat all of the composition. The entire quantity of the composition need not be heated up, for example, those instances where a relatively large amount of vaporizable material can be removed from a relatively small portion of the composition and thereby provide an adequate reduction in the vaporizable component content of the entire amount of composition to be processed. In such instances it is also advantageous to transfer, in heat exchanges, a portion of the heat content of the processed and concentrated compositions, after such compositions pass the vaporization wall, to those portions of the composition which have yet to be processed by being circulated past the vaporization wall.

A particularly suitable procedure for supplying additional heat to the vaporization wall involves the use of a heat pump whereby heat may be supplied to the vaporizing wall from the condensing wall. The heat pumps that can be employed in this regard include those which are used in standard cooling or refrigeration installations. In such cases the cooling medium must be compatible to the vapor pressure curve of the operating temperature range of the devices of the present invention. A mechanical heat pump with a thermocouple can also be used as the heat pump with a thermocouple can also be used as the heat transfer means. Suitable heat pumps and their operation are disclosed, for example, on pages 316 to 317 of the book "Wie Funktioniert Das?," Bibliographisches Institut, Mannheim, Germany.

More substantial benefits can be obtained by using, as the porous vaporization wall, one having the shape of a hollow tube through which the material to be treated is passed, or one having another shape which will have a large outer surface area opposite the condensing wall. It is preferable that the distance between the vaporizing wall and the condensing wall, i.e., the vapor diffusion space, be kept as small as possible in order to provide the best results.

Because of the simplicity with which the present invention can be used it is particularly useful for the recovery of components of a reaction system which have a faster rate of vaporization than the other components of the system under the prevailing reaction conditions which lead to an undesired disturbance of the reaction equilibrium. The process and devices of the present invention can be readily used to continuously recover and return the highly volatile components to the reaction system in order to maintain the desired concentration of reactants. The present invention may also be used to remove excess water from reaction systems in which water is being generated during the course of the reaction in order to, for example, maintain a specific pH in such reaction systems.

It is often necessary to separate or fractionate a composition into its various liquid components where the components have relatively similar boiling point ranges. This type of composition can be readily fractionated into its liquid component parts using the process of the present invention and one or more of the devices disclosed herein. More particularly, such compositions may be more readily processed in a device employing, in combination, a plurality of reconcentrator units in a sequence of processing stages wherein each stage employs a vaporizing and a condensation step. In such an arrangement of equipment the vapor diffusion area employed in each stage of the operation is a porous element filled with gas and bounded on one side thereof by a vaporization chamber and on the opposite side by a condensation chamber; or the vapor diffusion area can be a gas filled space bounded on one side thereof by a porous condensation chamber and on the opposite side by a porous vaporization chamber. In this arrangement, except for the provision of an outlet for the removal of the low boiling fractionated components which is provided in the condensation chamber of the final fractionating stage, the condensation chamber in each of the other stages of the installation are connected with the vaporization chamber of the next stage in the installation by means of two process material recycling lines, one of which lines also functions as a heat exchanger and the other of which lines is provided with pumping means; and the vaporization chambers of each stage are connected to each other by a series of supply lines provided with one way valves, which series of valved supply lines terminates in an outlet line provided in the vaporization chamber of the first stage of the device for the removal therefrom of the higher boiling fraction of the processed composition.

The essential advantage of a device employing such a plurality of processing stages lies in the fact that it allows for the formation of the most compact installations, so that it is possible, for example, to combine ten reconcentrator units, representing ten processing stages, each having base measurements of 10 cm. x 15 cm., into a single compact block which is only 6.5 cm. in height. Ordinarily the height of a reconcentrator unit having a single vaporizing wall, vapor diffusion area and cooling wall would be between 3 mm. and 50 mm. These individual compact installations are simple to prepare and are worth any expense involved in their preparation. It is also to be noted that such compact installations experience little operating difficulties and, if necessary, can also be easily dismantled.

Figure 4:
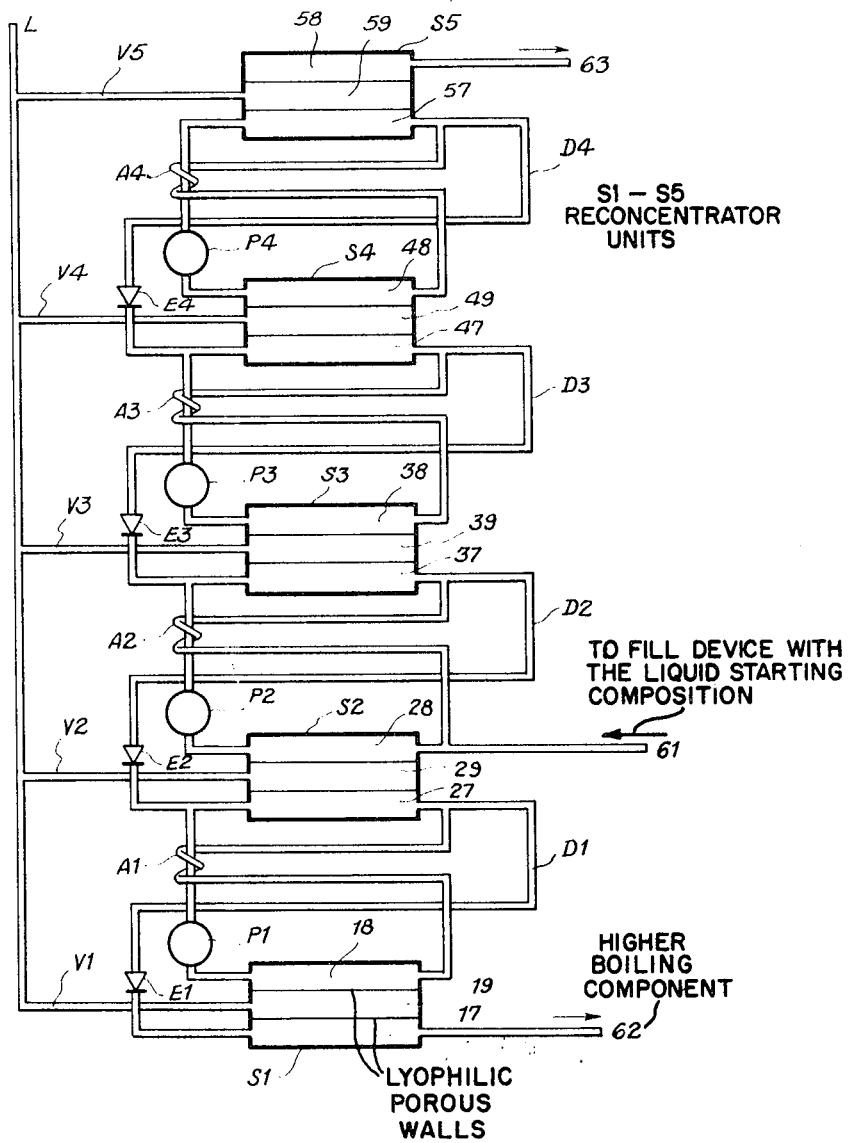
FIG. 4 shows a multistage fractionation deviĉe for use with the process of the present invention in a continuous manner.

A compact installation of the type described, in general, above, having a plurality of reconcentrator units for use in a sequence of processing stages, is shown in FIG. 4. The device of FIG. 4 has five reconcentrator units, S1, S2, S3, S4, and S5, each of which is used to sequentially process in a separate processing stage a liquid composition for the fractionation from such composition of two or more components which have similar boiling point ranges. Each of the units has a porous vaporizing plate or member, 17, 27, 37, 47 and 57, through which the liquid composition being fractionated is passed during the operation of the compact installation. Each porous vaporizing plate is also connected to a source of heat, which is not shown, and which is used to supply to the vaporizing plate the heat necessary to vaporize a portion of the processed composition therein and to maintain such composition at a constant temperature in such plate. Each of the units also has a porous condensation plate or member, 18, 28, 38, 48 and 58. Each of the porous condensation plates is also connected to cooling means, which are not shown, and which are used to cool the condensation plates in order to condense vapors from the processed composition and also to maintain the condensed vapors and condensation plates at a constant temperature. Positioned between the vaporization plates and the condensation plates in each unit are vapor diffusion areas 19, 29, 39, 49 and 59. The areas are made as narrow as possible in order to enhance the diffusion of vapor from the vaporization plate to the condensation plate. These areas, therefore, are usually made narrower than 1 mm., and preferably, are about 0.2 mm. thick.

The condensation chambers and the vaporization chambers of the device of FIG. 4 are open conduits with relatively thin porous walls adjacent the vapor diffusion areas.

A portion of the liquid passing through each vaporization plate is vaporized and the vapors diffuse through the porous walls in such plates, then through the vapor diffusion areas and finally into the porous walls of the condensation trays. The vapors condense in the condensation trays and pass as liquids into the open conduit portion of such condensation trays from where they are further processed as disclosed below.

All the vapor diffusion areas are linked to a common pressurized gas line L by means of gas feeder lines V1, V2, V3, V4 and V5. Pressurized gas is supplied to each of the vapor diffusion areas through such gas lines in order to maintain a gas pressure in such areas which is at least equal to, or somewhat greater than, the hydrostatic pressure of the liquid in the vaporization plates and in the condensation plates.

The condensation plate in each processing stage is joined to the vaporization plate of the next processing stage by means of pipe lines having pumping means P1, P2, P3, P4 and P5 therein for the purpose of providing a common circulation system for processing the starting composition throughout the installation. Thus, for example, pumping means or pump P1 serves to pump the condensed liquid formed in condensing plate 18 of stage 1 or unit S1 into vaporizing plate 27 of stage 2 or unit S2. Heat exchange means A1, A2, A3, A4 and A5 are used for heat exchange purposes at this point in each of the processing steps. Thus, for example, the heat of liquid being recycled from vaporizing plate 27 to condensation plate 18 is transferred by means of heat exchanges A1 to the condensed liquid being pumped from condensation plate 12 to vaporization plate 27 through pump P1. The same heat exchange process is conducted between each of the succeeding stages of the operation using heat from liquid being recycled from the vaporization plate of a next higher stage to heat up condensed vapors that are being pumped from a condensation plate in the next lower stage to the vaporization plate in such next higher stage.

In one of the preferred manners of operating the device of FIG. 4 an appropriate amount of liquid is also directly conveyed from the condensation plate or vaporization plate of the next higher stage to the condensation plate or vaporization plate, respectively, of the next lower stage. This is accomplished with the aid of lines such as D1, D2, D3 and D4. The amounts of liquid allowed to pass over lines D1, D2, D3 and D4 is regulated by valve means E1, E2, E3, and E4 respectively in such lines and such amounts correspond to the reflux used in the customary distillation columns. The device of FIG. 4 shows this reflux to occur between successive stages in the entire process. This reflux liquid flows counter current to the condensed vapors being moved from a lower stage to the next higher stage in the process.

If it is assumed that none of the composition being treated in the device of FIG. 4 is further supplied to the device over line 61 after the initial charge thereto, and none is removed therefrom, then, in time, with the recirculation in the device of the original charge of the starting composition, a concentration gradient sets up between the various fractions of the starting composition wherein the lower boiling components of the composition preponderate in the cold condensation plates of the higher stages and the higher boiling components preponderate in the vaporization plates of the lower stages. Using an appropriate number of stages therefore, the pure lower boiling component can be drawn off from the condensation plate in the highest stage, as through line 63, and the higher boiling component can be drawn off from the vaporization plate in the lowest stage, as through line 62. Therefore, the starting material which is to be fractionated is continuously charged into the multistage device at a stage in the device which has a composition therein which is similar in making up or percentages of components as is present in the starting composition. In the device shown in FIG. 4, the starting material is continuously fed over line 61 into condensation plate 28 of stage 2 of the five stage device.

It is to be noted that the values E1, E2, E3 and E4 allow the liquid therein to travel only in one direction.

In the device shown in FIG. 4 the two porous vaporization and condensation plates used in each stage, together with the vapor diffusion areas therebetween can be replaced by a porous lyophobic foil. The operation of the device of FIG. 4 proceeds in essentially the same way if elements 17, 27, 37, 47 and 57 therein, with attached heating means, are used as vaporization chambers, and elements 18, 28, 38, 48 and 58, with attached cooling means, are used as condensation chambers, and elements 19, 29, 39, 49 and 59 are used as the porous lyophobic foils. The foils would also be <1 mm. thick, and preferably about 0.2 mm. thick. When using such foils, gas lines L, V1, V2, V3, V4 and V5 would not be needed. In order to fill the foils with gas, such as hydrogen, the installation can be pressurized with gas through lines 62 or 63 by closing line 61 prior to the charging of the installation with the starting composition to be fractionated therein.

Where it is desired to conduct the process of the present invention continuously without the need for an extensive series of individual vaporizing and condensing steps and an attendant extensive number of pumps, supply lines and the like as was used in the devices of FIG. 4, and especially for the separation of vaporizable components which have similar boiling point ranges, a further modification of the process of the present invention may be employed. In this modification the recovery of vaporizable components from a liquid composition is accomplished in a simple way, and continuously, with the use of a device which has a gas filled chamber positioned between the near sides of two porous surfaces or layers. The liquid composition is brought into contact with the two far sides of such porous surfaces or layers.

The gas filled chamber may be called the vapor diffusion chamber. This vapor diffusion chamber is thus positioned between the near sides of two porous layers. The liquid composition being processed in accordance with the present invention is heated and brought in contact with the far side of one of the porous layers by being caused to flow past such far side of such porous layer. This porous layer may be termed the porous vaporization layer. The other porous layer can be termed the porous condensation layer. Vapors from the heated liquid pass through the vaporization layer, the gas diffusion area and condense in the condensation layer and then pass out the other side of the condensation layer into a condensate collecting chamber. The condensate may be removed from the device entirely if it has the desired degree of purity, or it can be recycled through the device until the desired degree of purity is obtained.

During the continuous operation of this device it is preferable, when supplying liquid to the device to be fractionated, that such liquid be introduced into the device at a place where the composition of the liquid already being processed in the device is the same as the fresh supply of such liquid.

In order to avoid the occurrence of undesirable lateral diffusion of the vapors of the vaporizable components in the vapor diffusion area as well as in the vaporization chamber and in the condensation chamber it is preferable to partition these chambers into a series of smaller sized subchambers by means of partitioning cross pieces. These cross pieces should therefore be relatively impervious to liquids or gases. These cross pieces can also be used as vertical supports or spacing elements between elongated vaporization chambers and condensation chambers which will be positioned opposite each other in parallel layers.

In order to obtain a magnification of the difference in the boiling points of the individual vaporizable components that are to be separated from each other, it can be advantageous in certain instances, to operate the modified device of this invention under elevated pressure conditions instead of under normal atmospheric conditions. If the use of elevated pressure conditions provides only little or no magnification of the difference in the boiling points of the vaporizable components being recovered, then it is profitable in such cases to operate under reduced pressure conditions, since then considerably less amounts of heat are necessary with which to cause vaporization of the vaporizable components than would be needed when operating under normal or elevated pressure conditions.

A device in which this modified process may be conducted will be described below with reference to FIGS. 5 to 7. Since this modified process can be conducted without regard to the configuration of the device, so long as no differences in density arises between various fractions of the liquids being processed therein, the device can be rolled up and used in a coiled or spiral configuration. It is only necessary that the length of the vaporization and condensation chambers significantly exceed this width. This requires first of all, therefore, that the process depend so to speak on a fractionation that is conducted at a constant rate. This constant rate fractionation can be induced by removing or supplying the heat of vaporization or the heat of extraction along the length of the vaporization and condensation chambers at a certain rate. This is possible, therefore, since the supply and removal of heat are conducted independently of the supply and removal of liquid to and from the device. The devices for the modified process may be further explained with reference to FIGS. 5, 6 and 7.

Figure 5:
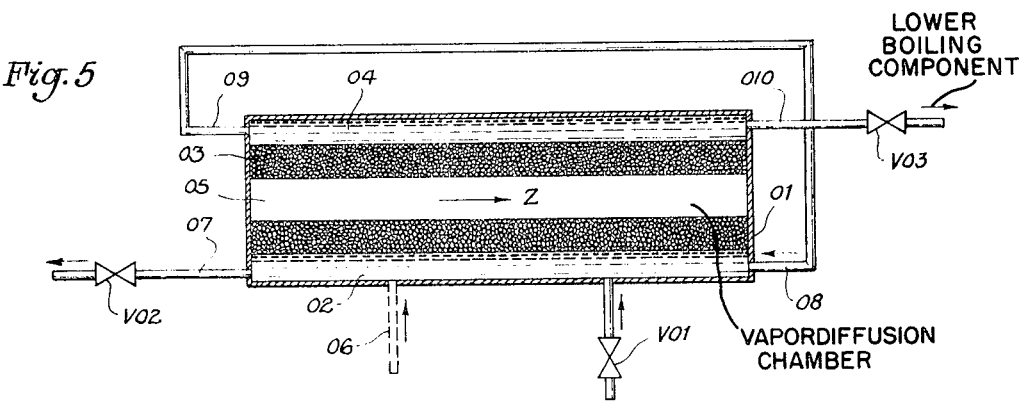
FIG. 5 shows a one stage fractionation device which employs relatively long porous vaporization and condensation chambers.
Figure 6:
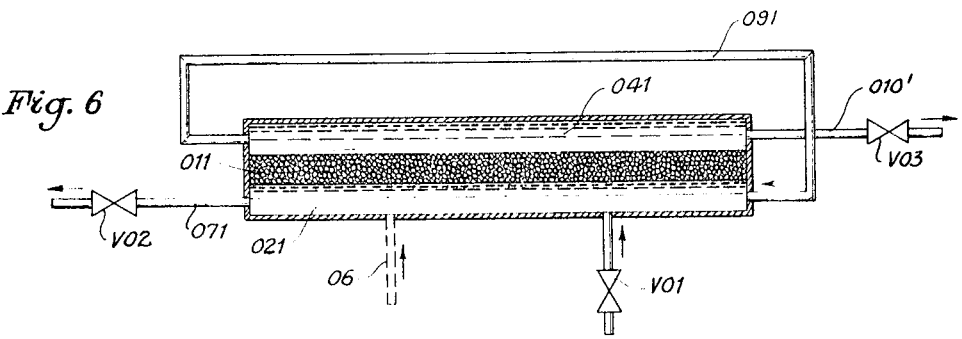
FIG. 6 shows a modifiaction of the device of FIG. 5 wherein a single porous layer is employed.
Figure 7:
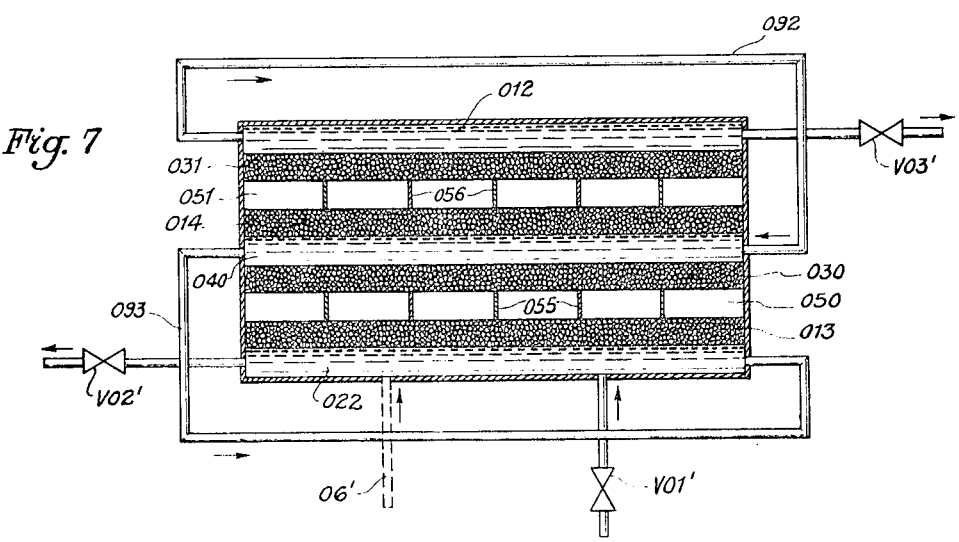
FIG. 7 shows a multistage device of the type shown in FIGS. 5 and 6.

At least one readily vaporizable component of a composition containing two or more of such components can be readily and continuously removed from such composition using the devices of FIGS. 5, 6 and 7. In the device shown in FIG. 5 porous layer 01 is adjacent to vaporization chamber 02 and porous layer 03 is adjacent to cooling or condensation chamber 04. A very narrow vapor diffusion chamber or gap 05 is positioned between porous layers 01 and 03. Layers 01 and 03 may be lyophilic. During the operation of the device with lyophilic layers 01 and 03 an appropriate gas pressure is provided in chamber 05 with pressurized gas. The pressurized gas employed is preferably hydrogen because of its faster back diffusion and it is used at a pressure which will be higher than the highest hydrostatic pressure that will be applied by the liquids in chambers 02 or 04. Vapor diffusion chamber 05 is a long narrow area which runs in the direction of the arrow shown therein. This chamber 05 can be subdivided, however, into several sub-chambers, with crossbars so that so-called cross or lateral diffusion or vapors therein is suppressed.

The starting composition or solution which is to be fractionated is supplied to the device through supply line 06. Supply line 06 can be inserted into vaporization chamber 02 or condensation chamber 04. The positioning of supply line 06 is determined by the fact that it must be inserted in a place where the liquid in the chambers 02 or 40 has approximately the same composition as the fresh liquid being supplied to the device over line 06. When a portion of the condensate in chamber 04 is fed over lines 09 and 08 back to chamber 02 then a procedure arises for concentrating a vaporizable component of the liquid composition supplied through line 06.

The liquid composition in chamber 02 is heated and a portion of the vapors of the more vaporizable component of the composition diffuse through wall 01 and area 05 and condense in wall 03. The means for heating the liquid in chamber 02 and the means for cooling wall 03 are not shown. Wall 01 may be heated and/or the fluid in chamber 02 may be heated. The composition of the stream of vapor passing from wall 01 to wall 03 corresponds to the composition of the vaporized components in wall 01. The vapors that condense as liquids in wall 03 pass as liquids into chamber 04 due to the gas pressure in area 05. As the process continues the volume of liquid in chamber 04 increases and leads to a flow of the liquids in vaporization chamber 02 and in condensation chamber 04 with the aid of closed valves V01, V02, and V03. This flow of liquids in both chambers is opposite to the direction indicated by the arrow for the Z coordinate shown in area 05.

If valve V01 is now opened at a position 06 and a fresh supply of the liquid which is to be fractionated is supplied to chamber 02, then, the thereby created hydrostatic over pressure in chambers 02 and 04 operates to provide a feed of higher boiling or lower boiling fractions through lines 07 and 010, respectively, upon the opening of valves V03 and V02, respectively. The length of the diffusion area 05 and the speed of the flow of liquids through the chambers will determine the degree of purity of fractions.

The fractionating process conducted in the device of FIG. 5 can also be influenced by regulating the temperature gradients in chambers 02 and 04. Since the supply of heat is independent of the supply of the solution being fractionated, an arbitrary temperature profile can be used along the length of layer 01 in the Z direction. Correspondingly, a temperature gradient can be established along the length of layer 03 by correspondingly removing heat of condensation from such layer. Where the solution being processed in the device of FIG. 5 is composed of only two liquid components, then the lower boiling of the two components can be recovered over line 07, and the higher boiling can be recovered over line 010.

If the composition being processed consists of a solution of a solid component which has a low vapor pressure in a liquid, then the liquid component can be recovered over line 010 in pure form, and a concentrated solution of the solid substance can be recovered over line 07. This latter type of composition corresponds for example, to the type of solutions which might be processed in order to obtain distilled water. In processing such compositions the refluxing of condensate from chamber 04 to chamber 02 over lines 09 and 08 is not necessary since the dissolved solids having the low vapor pressure will remain in chamber 02, and only the solvent component is retained, in pure form, in chamber 04. In processing such compositions the inlet position 06 for the raw starting composition can also be placed at the position of inlet line 08 so that by reason of the starting composition being able to traverse the entire length of chamber 02 from inlet line 08 to outlet line 07 the dissolved solids in the starting composition which have low vapor pressures may be retrieved through line 07 in a completely or substantially concentrated form.

Instead of using lyophilic layers for porous layers 01 and 03 with vapor diffusion area 05 positioned therebetween as is used in FIG. 5, it is also possible to use a single lyophobic porous foil as shown in FIG. 6. In the device shown in FIG. 6 lyophobic foil 011 separates vaporization chamber 021 from condensation or cooling chamber 041. The operation of the device of FIG. 6 corresponds to the operation of the device shown in FIG. 5 as long as the capillary pressure of the fluids in the pores of layer 011 which are adjacent chambers 021 and 041 is greater than the hydrostatic pressure of the liquids in such chambers at any one place in the device. The solution being processed is thus heated in chamber 021 and the vaporizable components of the solution diffuse through layer 011 into chamber 041 where they are condensed. The condensed vapors may be recovered over line 010' or be recycled over line 091 to chamber 021. The lower boiling components of the solution may be recovered over line 071. It is advisable to construct foil layer 011 from a material which has the poorest possible heat transfer properties, since it will then be easy to maintain an effective difference in temperature between the two sides of the foil. The foil is preferably less than 1 mm. thick and is more preferably about 0.2 mm. thick.

During the conduction of the fractionation process in the device of FIGS. 5 and 6 the temperature of layers 01 or 011, or of the solution in chambers 02 or 021, can be raised to facilitate the vaporization of the lower boiling component of the solution when the concentration of the higher boiling component is high.

It is also advantageous when using very elongated vaporization and condensation chambers and relatively slow feeds of starting solution in the devices of FIGS. 5 and 6 to insert in such chambers cross bars or partitioning walls having narrow transverse openings therein. These cross bars or partitioning walls with such openings therein effectively stop or slow down the lateral diffusion of fluid in the chambers and thus enhances the vaporization of the vaporizable components therefrom, if a temperature gradient is arbitrarily maintained along the length of elongated chambers.

All the usual type of fractionation processes can be conducted with the devices shown in FIGS. 5 and 6. For special situations, however, the device shown in FIG. 7 may be very useful. Using the device of FIG. 7 it is possible, for example, to fractionate mixtures of vaporizable isotopes into the isotope components thereof, or, to at least provide a substantially enriched mixture of such isotopes by recovering an enriched mixture thereof from a solution containing such isotopes and higher boiling components. It is to be noted in this regard that in such cases the inlet line for the supplying of the liquid to be fractionated to the device need not be line 06' or valved line V01'. These inlet lines, as was also the case for lines 06 and valved line V01 in the devices of FIGS. 5 and 6 are only shown, in the positions in which they are in the drawings, for purposes of illustration only. In practice it is possible, without otherwise modifying the device of FIG. 7, to introduce the solution or mixture being fractionated into chambers 040 or 012, depending on the composition of such solution or mixture. The composition of the solution or mixture being charged into the device of FIG. 7 should be approximately the same as the composition of the liquid in the device at the place where the charging is to be conducted.

When a solution to be fractionated is charged into the device of FIG. 7 through line 06' or valved line V01' the liquid thus enters vaporization chamber 022 where the liquid is heated by heating means which are not shown. Vaporizable components of the liquid thus diffuse through porous layer 013, vapor diffusion area 050 and finally into a cool porous condensation layer 030 where they are condensed into a liquid. The condensed liquid from wall 030 flows into vaporization chamber 040 where it is heated and the vaporizable components of such liquid will in turn diffuse through porous wall 014, vapor diffusion area 051 and a cool porous condensation wall 031. The vapors will condense into a liquid in wall 031 and pass into condensate chamber 012. Areas 050 and 051 have cross bars 055 and 056 therein to prevent lateral diffusion of the vapors in such areas. Areas 050 and 051 may be pressurized with gas to prevent seepage of liquid therein through the porous walls from chambers 022, 040, or 012. The porous walls may also be lyophobic in order to further prevent such seepage. The liquids in chambers 022 and 040 can be heated at different temperatures to facilitate the fractionation of the components of the starting composition. The lower boiling components can be recovered through valve V03' and the higher boiling components can be recovered through valve V02'. The lower boiling components or fractions rich in such components can be recycled over line 092 and 093 for further processing in the device.

Aside from the possibility of using devices such as those shown in FIGS. 5 and 6 in one stage fractionation procedures, the devices of FIGS. 5, 6 and 7 provide further advantages in that the process of the present invention can be conducted therein practically independently of the geometric configuration of the devices provided that, as noted above, the vaporization chambers are longer than they are wide. The devices of FIGS. 5, 6 and 7 provide further advantages in that because of the simplicity of the construction of such devices it is possible, without further modification of such devices, to operate the devices under elevated pressure conditions, or preferably, for the purpose of conserving heat energy, under reduced pressure conditions, in contrast to operating the fractionation process under normal atmospheric pressure conditions.

It is advantageous to use stainless steel, copper or silver, or alloys of these metals, in making heat transfer surfaces of the vaporization elements and heat exchange elements employed in the devices disclosed herein.

In various of the devices disclosed herein wherein porous walls are used as the vaporization or condensation walls, such walls may be coarse pored throughout, that is, the size of the pores is about 0.1 to 300 $\mu$m. These walls may also be so constructed that they are coarse pored throughout the major portion of their width, but have a minor portion of their width, adjacent the vaporization chamber, which is fine pored, i.e., the size of such pores is about 0.1 to 15 $\mu$m.

One use for the process and devices of the present invention which is particularly noteworthy relates to the processing of the electrolyte fluid used in fuel cell batteries in order to remove excess water therefrom. The devices of the present invention may be readily adapted to process such electrolyte fluids. The basic unit for treating such fluids could be a reconcentrator unit having a hydrophilic porous vaporation tray, plate or wall and a hydrophilic porous condensation tray, plate or wall positioned less than 5 millimeters from each other in order to provide a rather narrow vapor diffusion space or area therebetween. If each of the walls is considered to have a near side and a far side it may be envisioned that the vapor diffusion area lies between the far side of the vaporization wall and the near side of the condensation wall. The vapor diffusion area is preferably pressurized with gas at a constant gas pressure which exceeds the hydrostatic pressure of liquid in the pores of the porous walls. Hot electrolyte circulated from a fuel cell battery is fed past and allowed to come in contact with and wet the near side of the vaporization wall whereupon, simultaneously, water from the electrolyte and the heat needed to vaporize the water will be absorbed by the porous vaporization wall. At the same time the far side of the porous condensation wall is cooled by cooling means, such as a stream of cool water which will absorb condensed water vapors that will be caused to migrate from the vaporization wall and condense in the condensation wall in accordance with the process of the present invention, and the cooling means will also absorb the heat of condensation from the condensation wall. The cooling means will cool the condensation wall to a temperature below that of the hot electrolyte so as to cause a diffusion of water vapors from the vaporization wall to the condensation wall as described above. Instead of using a stream of cool water, other cooling means may be employed, such as a flow of cold air, to remove the condensate and the heat of condensation from the condensation wall.

The flow of a molecule of water from the hot electrolyte to the cooling means on the far side of the condensation wall involves a series of interrelated kinetic reactions, the slowest of which determines the speed with which the excess water can be removed from the electrolyte. The sequence of reactions proceeds generally as follows in accordance with the findings of the present inventors:

(1) In the pores of the near side of the vaporization wall a film of electrolyte is present and the concentration of such electrolyte is held constant in such pores by reason of the constant flow of electrolyte past such near side. Water is vaporized from the meniscus of the pores of the vaporization wall which are on the far side of such side and adjacent the vapor diffusion area. In this way a filament-like stream of electrolyte flows to the surface of the meniscus which results in an enrichment of the nonaqueous component concentration of the electrolyte, such as KOH, in the vicinity of the meniscus. Equilibrium then prevails at this point if the amount of KOH which diffuses backwards into the liquid electrolyte on the near side of the vaporization wall under the influence of this KOH concentration gradient is equal to the counterflow of KOH in the electrolyte that is flowing towards the meniscus because of the convection of the electrolyte filament-like flow.

As a result of the enriching of the KOH concentration of the electrolyte in the surface of the meniscus of the pores on the far side of the vaporization wall the vapor pressure of the electrolyte is lowered. This undesirable effect can be avoided for the most part by using a vaporization wall having a porosity of greater than 40 volumes percent and a thickness of less than 0.5 millimeters or by making the vaporization wall hydrophobic.

(2) The speed with which the water molecule enters directly into the confines of the vapor phase from the surface of its liquid form is determined by the kinetic gas theory. The speed is approximately equal to the number of water molecules which appear per second on 1 cm.$^2$ of the surface area of the liquid when vapor pressure equilibrium conditions exist between the vapor phase and the liquid electrolyte phase.

This kinetic reaction is very fast and never would determine the speed of the removal of the water from the electrolyte.

(3) At a sufficiently small distance between vaporization surface and a condensation surface the convection of layers of gas or vapor lying in between such surface is negligible so that only a diffusion of such gas or vapors is possible for the movement thereof to any substantial extent under such circumstances. In order to have such diffusion process proceed as efficiently as possible this distance between the condensation wall and the vaporization wall should be less than five millimeter, and preferably about 0.2 millimeters.

(4) The condensation of the vapors within the pores of the condensation wall takes place practically ceaselessly.

(5) The condensed water vapor is carried off in the cooling medium on the far side of the condensation wall after flowing through the pores of such wall from its near side to its far side. By using a condensation wall having a porosity of more than 40 volume percent and a thickness of less than one millimeter sufficient condensed water vapor flows through the pores of such wall under a pressure differential of 0.1 atmosphere so as to result in this kinetic reaction not having a determining effect upon the speed of the removal of the water from the electrolyte.

The driving force behind the flow of water vapor is the pressure differential between the gas pressure in the vapor diffusion area and the hydrostatic pressure of the condensed fluid in the condensation wall.

In order to provide means for making use of the observations made by the present inventors as noted above they devised the hereinafter described methods for preparing thin metallic vaporization and condensation walls which can be used in all the processes and devices of the present invention.

Thin porous discs up to 0.3 millimeter in width were prepared by hot pressing carbonyl nickel powder at 450° C. with a pressure of 0.3 ton/cm.$^2$. They had a porosity of about 50 volume percent. A pair of these discs were used to form a reconcentration unit in which one disc would be the vaporization wall and other would be the condensation wall. Since they were very flexible and pliable and since they should not be permitted to touch during their use in the reconcentrator unit and should have a narrow distance between them, a thin layer of polyamide powder (trademark name Rilson, having an average particle size of 200 μm.) or another resin having the same properties was sprinkled on the side of one of the discs and the two discs were assembled side to side with the resin therebetween and then heated to the melting point of the resin. The polyamide resin flowed and linked the two discs together with a nubby type coating, which, upon cooling actually only covered a small portion of the surface of the discs, but the coating effectively prevented the vaporization disc from touching the condensation disc. Using this procedure it is possible to prepare reconcentrator units in which the two discs or walls are positioned from one another in a distance of less than 0.2 millimeter. As a result of the heating of the resin the two resins are bound tightly together so that when elevated gas pressures are exerted in the space between the discs, they will not separate from each other since they will be bound together by the large number of small solidified resin bridges between them.

Another method by which porous vaporization and condensation discs or walls can be joined together to form a reconcentrator unit for use in the processes and devices of the present invention involves the use of thin gasket foils made from thermoplastic resins such as polyethylene, polypropylene and polyfluoroethylene, which is preferably mixed with a material such as magnesium oxide, aluminum oxide or quartz powder, in order to increase the toughness of the discs made from the mixture.

From mixtures of this type individual discs or walls were stamped out in the form of foils which were about 0.3 millimeters thick, and a screen like member was used to separate two of the discs, one of which was to serve as the vaporization wall and the other the condensation wall in the resulting reconcentrator unit. With this procedure a strip of foil can also be inserted around the edges of the opposite sides of the two discs being joined together. By heating the combined elements together at about 150° C. under a pressure of about 0.2 ton/cm.$^2$ the thermoplastic resin is made to flow between the two discs and upon cooling, acts as a means for separating the two discs apart and bonding them together into a cohesive reconcentrator unit, which unit has an inner gas tight sealed gas chamber or vapor diffusion area. The layer of thermoplastic resin only covers a relatively small amount of the area of the bonded sides of the discs and although it keeps the two discs apart for a predetermined distance, it will not rupture under the gas pressures employed in the vapor diffusion areas of the devices of the present invention and thus cause a separation of the two discs.

A single reconcentrator unit of the type just described may be used for the removal of water and other vaporizable components from electrolytes and other types of liquid compositions. In most cases, however, it is preferable and more expedient to use a plurality of such reconcentrator units in a multiunit installation such as those disclosed above in FIGS. 1 to 4 and 7. Another type of multiunit installation which may be used in this regard is the synthetic resin cast devices of British Pat. 1,178,264 which corresponds to U.S. application Ser. No. 706,102 filed on or about Feb. 16, 1968. Using the manner of construction disclosed in such applications the reconcentrator units can be so constructed that a chamber for the supplying of the composition to be processed, such as electrolyte, is provided between every two vaporization walls and a chamber for the supplying of a fluid cooling medium is provided between every two condensation walls. These arrangements can be rather simply realized by placing a solvent soluble resin such as polyvinylalcohol as a packing material between each pair of reconcentrator units to be used in the proposed multiunit installation, stacking the pairs of the units together and then completely casting the resulting block of units with a curable synthetic resin such as a polyepoxide. By means of an appropriate positioning of the solvent soluble resin between the reconcentrator units, it is possible, by removing such soluble resin with solvent after the hardening or curing of the cast resin casing to provide conduits through the walls of the casing, and between the reconcentrator units within the casing, for supplying to, or removing from, the installation, pressurized gas. electrolyte or other composition to be processed therein, cooling agents, and condensates such as water.

One modification of the use of such cast installations is characterized by the use of two layers of the solvent soluble resin, i.e., polyvinylalcohol. The surfaces of these two layers are so shaped that the faces thereof are so incongruent to each other and to the faces of the surfaces of the reconcentrator units between which they are employed, that, when the entire sequence of layers of resin and reconcentrator units are assembled and joined together, each layer of resin has one or more portions of the faces of its surfaces, such as the corners of its faces, the axial projections of which extend beyond the edges of the surfaces of the other layers of resin and/or the next adjacent reconcentrator units. The resulting arrangement of alternating tiers of solvent soluble resin and reconcentrator units is then completely encased in a thermoplastic resin, such as a polyepoxide resin. A plurality of conduits, about six, are then provided by boring through the cast walls of the installation, at right angles thereto, and at such locations that each of the borings only intersects projecting surface areas of either the thermoplastic resin layers or the reconcentrator units so as to provide common conduits for each of such elements. The solvent soluble resin is then removed with solvent from the inside of the cast installation, by extraction with solvent supplied through conduits which intersect the layers of resin, so as to provide a series of three types of chambers within the installation, each of which will have separate inlet and outlet conduits through the wall of the casing. The borings which intersect the projecting surface areas of the reconcentrator units are used for the supplying and removing of pressurized gas, such as a hydrogen fuel gas, to the vapor diffusion areas of the units. The borings which intersect the layers of resin which lie between the vaporization walls of the reconcentrator units form inlet and outlet conduits for circulating electrolyte, or other liquid to be processed in the installation, past the vaporization walls of the units after the layers of solvent soluble resin between the vaporization walls are removed. In a similar way the borings which intersect the layers of resin which lie between the condensation walls of the reconcentrator units form inlet and outlet conduits for circulating the cooling medium past the condensation walls of the units after the layers of solvent resin between the condensation walls are removed.

It is not necessary, of course, for the borings to be round in shape, elongated angular shaped grooves, or borings having other shapes may be used which offer as little resistance as possible to the flow of the gas or liquid being conveyed through the bored conduits.

Figure 8A:
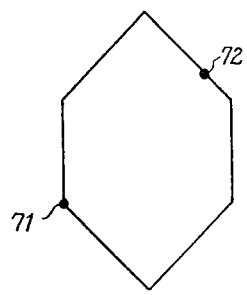
FIGS. 8a, 8b and 8c show elements for one type of a multiunit device of the present invention.
Figure 8B:
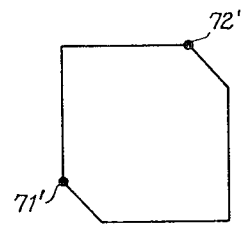
Figure 8C:
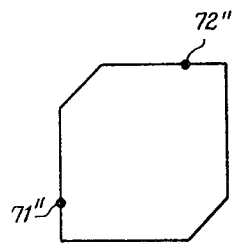

FIGS. 8$a$, 8$b$ and 8$c$ show three possible shapes for the surfaces of the sides of the layers of solvent soluble resin and the reconcentrator units. FIG. 8$a$, for example, shows a possible shape in which the reconcentrator unit may be formed. FIG. 8$b$ and FIG. 8$c$ show possible shapes in which the layers of soluble resin may be formed for use in the intended areas, respectively, for the electrolyte chambers between the vaporization walls and the cooling medium chambers between the condensation walls. Thus, when reconcentrator unit having the shape shown in FIG. 8$a$ is arranged between a layer of resin having the shape shown in FIG. 8$b$ and a layer of resin having the shape shown in FIG. 8$c$ so that points 71, 71' and 71" abut each other, as also points 72, 72' and 72", then it is to be noted that two of the corners, or non-truncated edges of each of the elements project beyond truncated areas of the surfaces of the adjacent elements. It is obvious that, without changing the other elements, ring shaped spacing or sealing elements that are soluble in solvents may be used instead of the foil like resin layers. Such ring shaped elements can be removed with solvent considerably faster.

EXAMPLE A

This example discloses the preparation of a cast, reconcentrator unit installation. Two hot pressed carbonyl nickel discs were used as the vaporization wall and as the condensation wall. The discs had a porosity of 60 volume percent, were 0.8 mm. thick, and had a surface area of about 300 cm.$^2$ and were prepared by stamping the discs from the powder at a temperature of 450° C. with a pressure of 0.3 ton/cm.$^2$. One side of the condensation wall was sprinkled with Rilsan polyamide powder, the vaporization wall was laid on its side on the polyamide coated side of the condensation wall and the two walls were fastened together in a sintering operation. The edges of the resulting compact installation were then coated with a film of epoxy resin and the unit was then completely cast in a curable polyepoxide resin which was cured to form a hard casing around the unit.

The cast unit was then provided with two ring shaped rubber gaskets for use at junctures between two plexiglass discs between which the cast unit was then arranged. Each of the plexiglass discs contained two bored conduits through which electrolyte or cooling medium could be supplied to, or removed from, the electrolyte and cooling medium chambers formed in the unit by the rubber gaskets. Hydrogen gas could be supplied to the vapor diffusion area between the walls by means of a conduit bored into such area for this purpose. When water at 60° C. is circulated through the electrolyte chamber and cool water at 25° C. is circulated through the cooling medium chamber then a diffusion of water in the amount of 270 cm.³/hour takes place across the vapor diffusion area. If, instead of the hot water, an aqueous solution of 6 n KOH at 60° C. is circulated through the electrolyte chamber, then the amount of water diffusing across the vapor diffusion area drops to 120 cm.³/hour.

The water and electrolyte were fed past the vaporization wall at the rate of 50 liters/hour.

These results indicate that the concentration of electrolyte in the pores of the vaporization wall causes a reduction in the water vapor pressure over the meniscus of such pores. As a result, a negative feed back of the water results with an accompanying reduction in the diffusion of water vapor which would amount to about 60 cm.³/hour because of the vapor pressure over the 6 n KOH solution.

EXAMPLE B

On the basis of the results obtained in the experiment conducted in Example A a multi-reconcentrator unit installation was prepared. The porous walls used in the reconcentrator units were only 0.3 millimeter thick and were prepared from carbonyl nickel powder as in Example A. In fabricating the individual reconcentrator units, the vapor diffusion area in each unit was made 2 mm. wide and the porous walls were made with surface areas of 150 cm.². The porous walls had a porosity of 40 volume percent. Four of the reconcentrator units were then stacked together in a space of 550 cm.³ and the block of units was then cast in a curable polyepoxide resin which was then cured. Provisions were made, as described above, for the circulation conduits for the electrolyte and cooling water.

The units were arranged within the block in such a way that each unit would concurrently process about 20 liters/hour of electrolyte. When 6 n aqueous KOH at 60° C. was processed in the multiunit installation using 25° C. cooling water, 150 cm.³/hour of water was recovered from the KOH solution. This indicates that the speed of the vapor diffusion process is determined for the most part by the width of the vapor diffusion area.

EXAMPLE C

A reconcentrator unit was then prepared as in Example A in which the vaporization wall and the condensation wall was each 0.3 mm. thick and with a vapor diffusion area which was 1.0 mm. wide. The surfaces of the walls were 150 cm.² and the walls had a porosity of 50 volume percent. When 30 liters/hour of 6 n aqueous KOH at 65° C. were fed past the vaporization wall, and the cooling water had a temperature of 25° C., 105 cm.³/hour of water were removed from the KOH solution.

In another modification of the present invention involving the use of the resin encased installation, the solvent soluble resin layer, from which the cooling medium chamber is formed adjacent the far side of the condensation wall, can be so constructed that it extends up to the edges of two of the inner surfaces of opposite sides of the cast casing. After a casting operation in which four reconcentrator units are cast together, as in Example B, and with the extended resin layer adjacent the condensation walls, it is possible, by then removing the extended resin layer to provide an installation having fissure type openings in the top and bottom of the installation for the use of cool air as the cooling medium instead of cool water. With the aid of a small ventilator for the supplying of such cool air, it would then be readily easy to provide for the removal of the water from the electrolyte. When using this type of installation for the processing of hygroscopic liquids such as alkali electrolytes, it has been shown to be advantageous to lower the vapor pressure in the condensation walls to such an extent, by soaking or impregnating the condensation walls with an aqueous solution of sodium chloride, that no drying out of the condensation walls takes place during the cooling of such walls, by reason of the hygroscopic action of the electrolyte Any vapor diffusion problems that might arise in the foil condensation wall by reason of the use of the sodium chloride solution in such walls can be suppressed by the use of thin foils, i.e., about 0.3 mm., for such condensation walls.

It is apparent that, instead of using solutions of sodium chloride, the condensation walls can also be impregnated with aqueous solutions of other organic or inorganic materials in order to have the desired effect of lowering the water vapor pressure inside the condensation wall so much that, under constant temperature conditions, a fixed amount of condensate always remains behind in the condensation wall. This phenomena leads to the result that, although excess gas pressure is maintained in the vapor diffusion area, the condensation wall is rendered impermeable to the pressurized gas.

Instead of using the combination of hydrophilic porous vaporization and condensation walls with a vapor diffusion area therebetween as the reconcentrator unit, a porous foil made of a hydrophobic resin can also be used as noted above with reference to the device shown in FIG. 6. Suitable hydrophobic resins that can be used in this regard include polyethylene, polytetrafluoroethylene, polypropylene.

Polyethylene foils are prepared, preferably, by calendering them to the desired thickness while admixed with a soluble filler such as sodium carbonate in amounts of the order of 40 to 70 volume percent. Subsequent treatment of the calendered foil with a selective solvent for the filler, such as water or acetic acid in the case of sodium carbonate, will only remove the filler and leave a porous foil. Foils made this way from these resins which were 0.2 mm. thick have proven effective for the desired purpose.

When the porous hydrophobic resin based foil is used as the sole element of the reconcentrator unit as shown in FIG. 6, the electrolyte or other solution flowing past it on the vaporization side of the foil, and the cooling medium flowing past it on the condensation side of the foil cannot become intermixed within the pores of the foil because a substantial penetration of the two liquids into the foil is prevented by the capillary depression. Thus, water can be vaporized from a hot solution on the vaporization or vapor inlet side of the foil, diffuse through the foil as a vapor, and be condensed on the condensation or condensate outlet side of the foil and be carried away from there by the cooling medium.

When air is used as the cooling medium, and alkaline solutions are being processed in the reconcentrator, it is preferable to place the porous resin based foil on a porous metal foil, without a vapor diffusion area therebetween, and the condensed water is removed from the metal foil by the flow of cool air. In using this type of device the water filled hydrophilic metal foil prevents the air, with its deleterious $CO_2$ content, from coming into direct contact with the alkaline solutions, such as KOH electrolyte. In order to also prevent a back diffusion of the condensed water and a drying out of the hydrophilic foil, because of the possible hygroscopic nature of the solution being processed, the hydrophilic metal foil can be pretreated with an aqueous solution of sodium chloride, or another solution having correspondingly low vapor pressure properties.

In operating the reconcentrator devices of the present invention for the recovery of water and other vaporizable materials from various types of compositions, as disclosed herein with respect to the resin encased installations, the cooling medium can be supplied in a direct current manner, or in a countercurrent manner, or in a cross current manner.

When a hot solution is being processed in the devices of the present invention the solution usually serves to carry into such devices the components thereof which are to be vaporized as well as the heat needed to effect the vaporization. In other situations it may be desirable to separate these two supply processes. Thus the supply of heat to the vaporization wall can be carried out with the aid of electrical heating means attached to the walls, or by the use of a separate heating fluid, if such an arrangement will provide a worthwhile change in the concentration of the processed fluid, due to the removal of vaporized components therefrom, during the residence time of the processed fluid along the vapor inlet side of the vaporization wall. Correspondingly, cooling elements other than the cool air or cool liquids used on the condensate outlet side of the condensation wall can also be brought in contact with the condensation wall if it is desirable to lengthen the period of time during which the vapors to be condensed, or the condensate, are to be in contact with the condensation wall. The supply and removal of heat during the operation of all the devices of the present invention should present no difficulties. Heat can be supplied by direct or indirect electrical heating or by the reversible movement of heat between hot and cool surfaces with the aid of heat pumps as noted above.

When the solution to be processed is passed between two vaporization walls as shown in FIGS. 1 to 3, or as disclosed above with respect to the resin encased multiunit installations, the distance between the two vaporization walls is dependent upon the length of the path through which the solution is to be conveyed during the vaporization step in the process. The distance between the porous vaporization wall and the porous condensation walls, i.e., the width of the vapor diffusion area, should, on the other hand, always be made as small as possible.

An essential advantage in using the resin encased type of reconcentrator devices in accordance with the present invention lies in the fact that small sized units can be provided for use with large sized fuel cell batteries in order to maintain the concentration of aqueous electrolytes employed in the battery at a desired level, as well as in the fact that the small compact units are capable of drawing off excessive amounts of heat from the fuel cell battery system.

Where the reconcentrator units of the present invention are being used to remove excess water from hot electroylte that is being circulated to and from fuel cell batteries it is desirable to remove excess heat as well as excess water from such electrolytes. Although it is desirable to remove excess heat from the electrolytes it is to be noted, on the other hand, however, that it is equally important for the battery to operate at its optimum operating temperature so that the concentrated electrolyte should not be recirculated too hot to the battery, nor be cooled too much before it is recirculated. The present inventors have devised a combination of devices which solves this problem.

Figure 9:
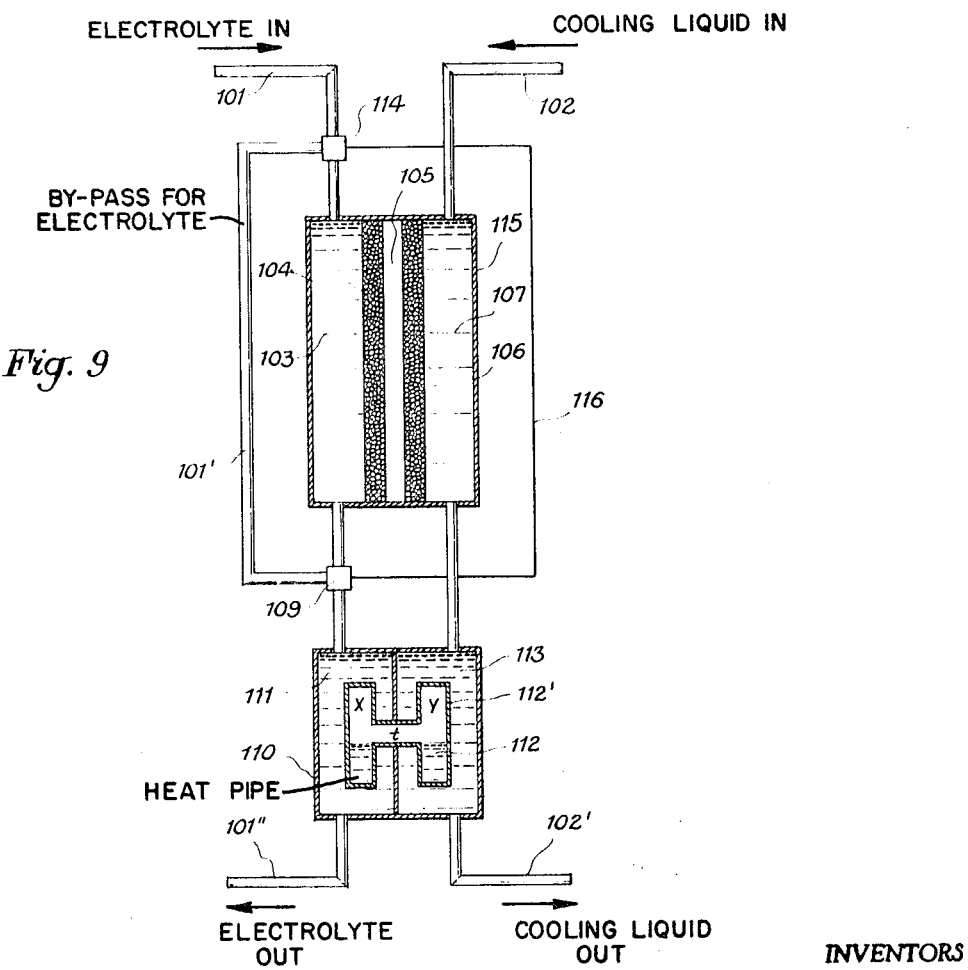
FIG. 9 shows a fractionation device with a heating pipe.

The means for regulating the temperature of the circulated electrolyte is shown in FIG. 9. The operation of the temperature regulating means is based upon the use of a combination of two mechanical elements, the first of which provides that only enough electrolyte is permitted to reach the vaporization chamber of the recondenser unit as is necessary in order to lower the operating temperature of this electrolyte. The second element insures that the temperature of the electrolyte itself can be then lowered to its optimum operating level when the total amount of electrolyte flows through the vaporization chamber and loses some of its heat therein but not enough to lower the temperature of the electrolyte to its optimum operating temperature.

These results are achieved in part by the use of a hollow H-shaped piece of equipment which operates according to the so-called "heat pipe" principle. This H-shaped element is partially filled with a liquid which will just begin to boil at a temperature which is in the area of the temperature which is desired for the electrolyte. One of the vertical legs of the H-shaped element is positioned in an electrolyte collection chamber which is connected to the vaporization chamber of the recondenser unit. The second vertical leg of the H-shaped leg is positioned in a second chamber which is adjacent to, but sealed off, from the electrolyte collection chamber by a partitioning wall. The horizontal leg of the H-shaped element connects the two vertical legs of the H-shaped element through the partitioning wall. The cooling medium used in the condensation chamber of the recondenser unit also flows through the second chamber and around the second vertical leg of the H-shaped element.

A better understanding of the device can be had by making reference to FIG. 9 which shows one modification of the proposed device. The two elements which are used with the basic recondenser unit 115 to regulate the temperature of the electrolyte are the bridging electrolyte line 101' and twin chambered member 110. These elements operate in such a way as to insure that the temperature of the electrolyte returning to the battery is at its optimum operating temperature with the understanding that these elements only function in this manner if the temperature of the electrolyte leaving the battery is higher than its optimum operating temperature.

The recondenser unit 115 shown in FIG. 9 has, as its basic components, a vaporization chamber 103, porous walls 104 and 106, vapor diffusion area 105 and condensate collection chamber 107.

The hot electrolyte from the battery is supplied over line 101 into liquid dispensing means 114, the the operation of which is so regulated, over control line 116, by heat sensing means 109, that liquid dispensing means 114 increases the amount of electrolyte to be delivered in a given period of time over line 101', and thus decreases the amount of electrolyte flowing directly into vaporizing chamber 103 of the recondenser unit, if the temperature of the electrolyte leaving vaporization chamber 103, as sensed by element 109, is lower than the expected calculated value. If, however, the temperature of the electrolyte leaving vaporization chamber 103, as sensed by device 109, is too high then liquid dispensing means 109 operates so as to cause a greater flow of electrolyte into vaporization chamber 103.

The electrolyte in chamber 103 flows past porous layer 104. The fluid electrolyte is prevented from entering the pores of layer 104 by reason of the fact that vapor diffusion area 105 is pressurized with gas, preferably hydrogen, at a predetermined level of pressure.

A portion of the water in the electrolyte in chamber 103 vaporizes and diffuses through porous wall 104, vapor diffusion area 105 and then into porous wall 106. The vaporization of the electrolyte cools layer 104 and this layer in turn absorbs heat from the electrolyte flowing by in chamber 103. The gas pressure in area 105 forces the condensed vapors out of porous layer 6 and into the liquid cooling medium in chamber 107. The gas pressure also prevents the cooling medium from entering the pores of layer 106. The liquid cooling medium is circulated past layer 106 from line 102 to cool such layer to a temperature below that of the electrolyte in chamber 103. The cooling medium can be further circulated through a heat exchanger, a cooling tower, or similar device, before leaving line 2' for recirculation purposes.

If the entire amount of electrolyte flowing through line 101 is all allowed to pass through chamber 103 by closing line 101' by means of dispensing means 114, and its temperature is still too high when it flows through heat sensing device 109 in spite of loss of heat during the vaporization step, then heat removing device 110, which was referred to above and which operates in accordance with the "heat-pipe" principle, automatically begins to function to correct this situation. Hollow member 112' has hollow legs $x$ and $y$ and hollow cross piece $t$. A liquid 112 is placed in both legs up to about the lower level of cross piece $t$. The liquid used in this regard is one that will begin to boil at temperatures which are above the desired optimum operating temperatures for the electrolyte when electrolyte which is hotter than such desired operating temperatures flow past leg 4 of member 112' in chamber 111. Member 112' is constructed of materials which have good heat transfer properties, of the types disclosed above. The vapors from liquid boiling in leg 4 will pass through cross piece $t$ into leg $y$ of member 112'. Since chamber 113, in which leg $y$ is situated, has the cooling medium flowing through it, the cooling medium will also cool leg $y$ and cause the vapors therein to condense, and, because of the configuration of member 112', the cooled condensate will overflow from leg $y$ and flow back over cross piece $t$ into leg $x$. The electrolyte in chamber 111 will experience drop in temperature due to the heat removed from such electrolyte during the vaporization of the liquid in leg $x$. The electrolyte in chamber 111 can thus be cooled to the desired optimum electrolyte operating temperature. When this optimum temperature is reached the liquid in leg $x$ will cease boiling so that no further cooling of the electrolyte will occur. The cooled electrolyte can then be recirculated over line 101'' to the fuel cell battery.

The dimensions of the pieces of equipment shown in FIG. 9 have been shown in a large enough scale so as to provide for a facile understanding of the invention. In practice, however, chambers 103, 105 and 107, primarily, as well as layers 106 and 106', would be made much narrower, i.e., of the order of 0.5 to 3 mm. In addition, in many instances it is advisable to lengthen the surfaces of the vaporizing and condensing elements in devices 110 and 115 and to also use more than one of such devices in the electrolyte circulation system. These arrangements depend on the requirements of the fuel cell battery in which the electrolyte is being used. These arrangements, however, can be readily arrived at without the need for further calculations, or by the use of simple experiments designed to provide optimum working conditions.

In the process of removing water from the electrolyte of a fuel cell battery in accordance with the present invention it is particularly advantageous to supply the liquid electrolyte to the reconcentrator unit at the highest temperature possible. On the other hand, the operating temperature of fuel cell batteries in which such electrolytes are employed is only about 40° C. If electrolyte with a temperature of about 40° C. is introduced into the reconcentrator unit for the removal of water therefrom, the vapor pressure of such electrolyte is relatively low and too small an amount of water will vaporize through the porous vaporization wall and into the vapor diffusion area.

The present inventors have developed a procedure, whereby, with the additional expenditure of the smallest possible amounts of energy, it is possible to convey electrolyte, or other hot liquid to be processed in the reconcentrator units, to the reconcentrator at the highest possible temperature. This procedure is particularly suitable for use in those cases where water is the vaporizable component which is to be removed from the composition being processed in the reconcentrator. This procedure, furthermore, is also particularly suitable for use in those situations where it is desirable to maintain the concentration, in an aqueous solution, of components having a higher boiling point than water, such as in the case of maintaining the concentration of KOH in an electrolyte which is used in the operation of galvanic fuel cell elements.

This procedure involves the use of a heat pump to supply heat to the electrolyte, or other composition being treated in the reconcentrator, as it enters the reconcentrator. The heat pump is used to transfer heat from electrolyte in one other point in the electrolyte circulation system to electrolyte in the inlet line of the reconcentrator. The heat pump may be placed, for example, between the electrolyte chamber of a fuel cell battery, or the electrolyte recirculation line going from the reconcentrator to the battery, and the inlet line of the reconcentrator. The heat pump is so arranged that heat from electrolyte in the electrolyte chamber of the battery, or in the electrolyte recirculation line, is conveyed to the electrolyte entering the reconcentrator.

EXAMPLE D

Seventeen fuel cell elements were combined in a single hydrogen-oxygen fuel cell battery. Water generated during the operation of the battery as a by-product of the electrochemical reaction involved passed into the liquid electrolyte used in the electrochemical reaction. The electrolyte was 6 n KOH.

This reaction water was removed from the electrolyte in a closed reconcentrator device of the present invention as described in Example B, to which the electrolyte was circulated for this purpose before being recirculated to the fuel cell battery. The temperature of the electrolyte as it left the fuel cell battery was 60° C. due to the heat absorbed by the electrolyte within the battery. A heat pump was inserted in that portion of the electrolyte circulation system which was between the electrolyte chambers of the fuel cell battery and the inlet opening of the reconcentrator device and it raised the temperature of the electrolyte so much that it was 80° C. at the inlet to the reconcentrator. When leaving the reconcentrator the concentrated electrolyte had a temperature of 50° C. A heat pump was also inserted in the portion of the electrolyte circulation system used to recirculate the concentrated electrolyte to the battery and this second heat pump was used to carry heat from the concentrated electrolyte to electrolyte entering the reconcentrator. As a result of the removal of heat from the concentrated electrolyte by means of the second heat pump the recycled concentrated electrolyte only had a temperature of 30° C. when re-entering the battery. The two heat pumps employed were of the type used in refrigerating technique.

In each case the electrolyte was circulated through the reconcentrator at the rate of 80 liters/hour.

What is claimed is:

1. A device for removal of heat from, and for concentration of the electrolyte in a fuel cell battery in which the electrolyte includes at least two components, at least one of which component is vaporizable under the prevailing operating conditions of said device, which device comprises, a porous vaporization wall formed of carbonyl nickel powder the pores of which are in the range of .1 to 300 μm., having a near side and a far side and which is permeable to said vaporizable component and substantially impermeable to nonvaporizable components of said composition from its near side to its far side, heating means for heating said composition to a temperature at which said vaporizable component will vaporize, composition-supply line means for bringing said composition into contact with the near side of said first wall in such a way that vapors of said vaporizable component will diffuse into the said first wall, a vapor diffusion chamber adjacent the far side of said first wall, means supplying hydrogen gas under pressure into said vapor diffusion chamber so that a hydrogen atmosphere is maintained in said vapor diffusion chamber, a porous condensation wall formed from carbonyl nickel powder having a near side and a far side and positioned with its near side adjacent said vapor diffusion chamber and laterally across from the far side of said vaporization wall, cooling means for maintaining the temperature of said condensation wall at a temperature below the condensation temperature of said vaporizable component such that the difference in temperature between that of said condensation wall and that of said vaporizable component causes the vapors of said vaporizable component to diffuse from said first wall, through said vapor diffusion chamber and onto said condensation wall where said vapors will condense as liquid due to the temperature of said condensation wall, condensation recovery means for recovering condensate from said condensation wall, and processed composition recovery means for recovering the processed composition after the removal of the vaporizable components therefrom.

2. A device as in claim 1 in which the distance in said vapor diffusion area between said walls is less than 5 millimeters.

3. A device as in claim 2 in which said distance is about 0.2 to 1 millimeter.

4. A device as in claim 1 in which the sides of both of said walls are of approximately the same dimensions.

5. A device as in claim 1 in which both of said walls are less than five millimeters wide.

6. A device as in claim 5 in which said condensation wall is porous and permeable to said vaporizable component and said condensate from its near side to its far side.

7. A device as in claim 6 in which said walls are each less than about one millimeter wide.

8. A device as in claim 6 in which each of said walls has a porosity of at least 6 volume percent.

9. A device as in claim 1 in which both said walls are hydrophilic.

10. A device as in claim 1 in which said vaporization wall is lyophobic.

11. A device as in claim 10 in which both of said walls are lyophobic.

12. A device as in claim 11 in which said electrode is a hydrogen electrode.

13. An installation comprising a plurality of the devices of claim 1 adapted as successive stages of a fractionation installation in accordance with the cascade reflux principle, with composition supply line means for supplying said composition to said installation, with internal pumping, circulation line, and recycling line means for moving impure fractions of said composition to and from the stages of said installation, and with fraction recovery means for recovering fractions of said composition from said installation.

14. A device as in claim 1 further comprising processed composition temperature regulating means for regulating the temperature of the composition while, or after, it is processed in said device so that it has a predetermined temperature after it is processed.

15. A device as in claim 14 in which said composition temperature regulating means comprises a heating pipe.

16. A device as in claim 1 further comprising condensate recycling means for recycling condensate for reprocessing in said device.

17. A device as in claim 1 further comprising diffused vapor directing means for curtailing lateral diffusion of the vapors in said vapor diffusion area.

18. The device for removal of heat from, and for concentration of the electrolyte of a fuel cell battery of claim 1 in which water is used to cool said condensation wall.

19. The device of claim 1 in which said vaporization wall comprises two porous layers, the layer at the near side having its pores in the range of .1 to 15 $\mu$m., and the pores of the remainder of the vaporization wall lying in the range of .1 to 300 $\mu$m.

References Cited

UNITED STATES PATENTS

| | | | |
|---|---|---|---|
| 2,445,350 | 7/1948 | Ginnings | 202—172 |
| 2,720,980 | 10/1955 | Thomas | 210—72 |
| 2,905,527 | 9/1959 | Dole | 210—72 |
| 2,958,657 | 11/1960 | Binning et al. | 210—321 |
| 3,129,146 | 4/1964 | Hassler | 210—321 |
| 3,274,029 | 9/1966 | Lune et al. | 136—86 C |
| 3,300,341 | 1/1967 | Gregory et al. | 136—86 C |
| 3,340,186 | 9/1967 | Weyl | 203—11 |
| 3,371,468 | 3/1968 | Shropshire | 55—158 |
| 3,378,403 | 4/1968 | Waubke et al. | 136—86 C |
| 3,385,769 | 5/1968 | Brose | 210—321 |
| 3,447,286 | 6/1969 | Dounoucos | 55—158 |
| 3,455,743 | 7/1969 | Huebscher et al. | 136—86 C |

WILBUR L. BASCOMB, JR., Primary Examiner

U.S. Cl. X.R.

136—86; 159—Dig. 28; 210—176, 321; 55—158; 203—2, 11, 49, 100, Dig. 18, 91; 202—173, 172